Jan. 5, 1971     T. R. HAWKS     3,552,838
BRIDGE ADJUSTMENT FOR BIFOCAL EYEGLASSES
Filed Sept. 13, 1968
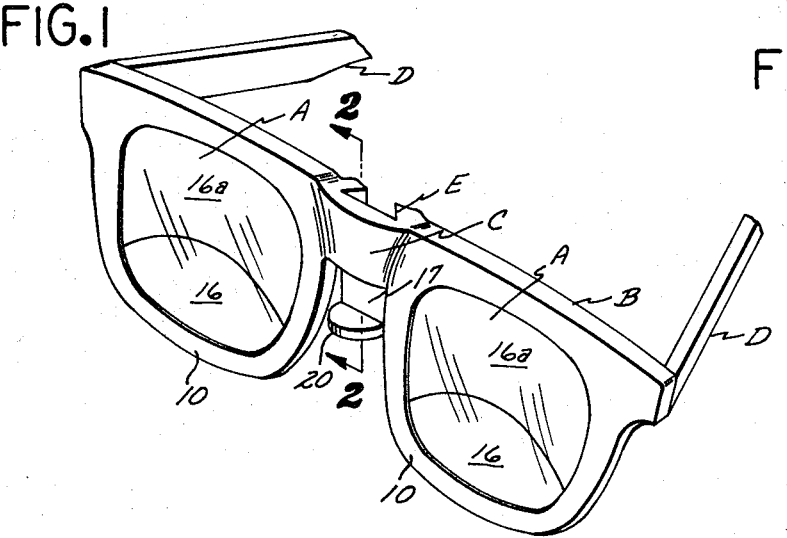
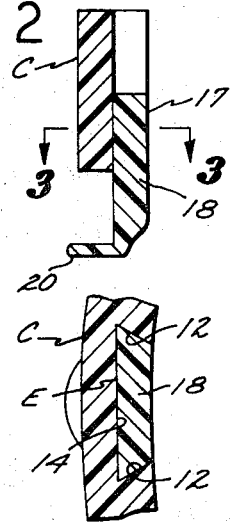
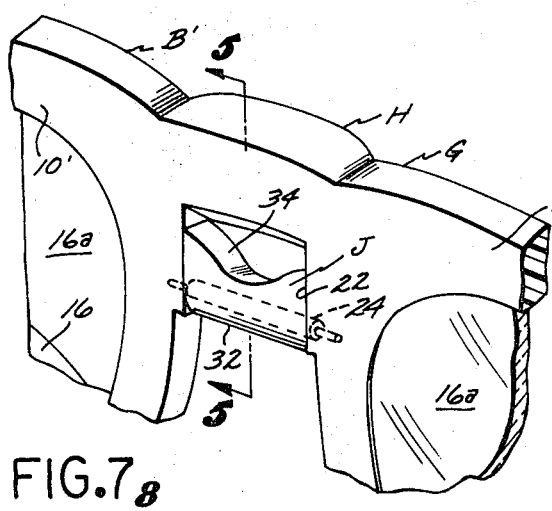
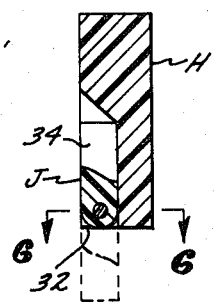
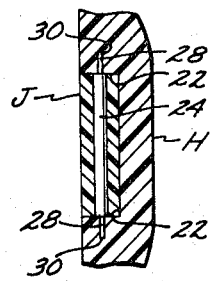
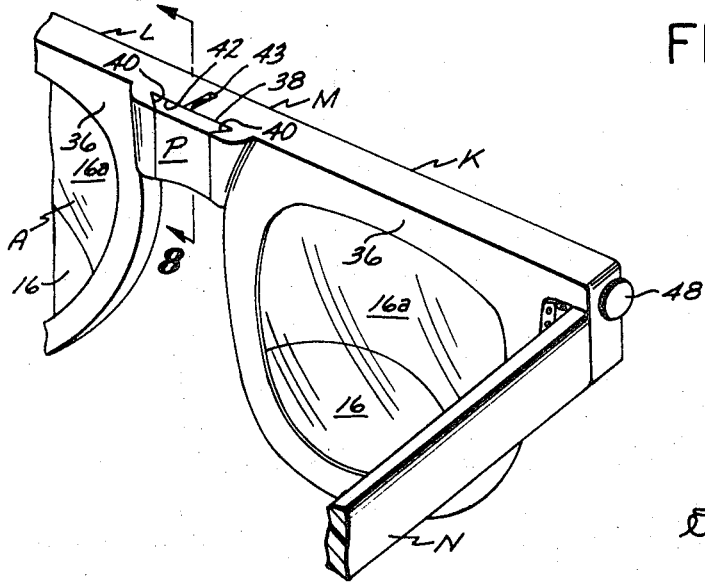
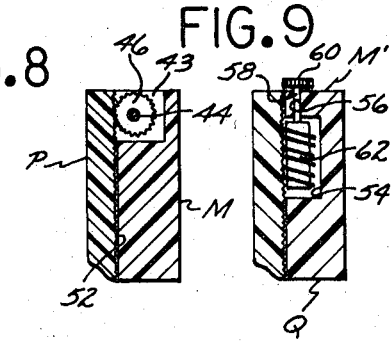
INVENTOR.
THOMAS R. HAWKS
BY
William G. Babcock
ATTORNEY 3,552,838
BRIDGE ADJUSTMENT FOR BIFOCAL
EYEGLASSES
Thomas R. Hawks, 801 E. 37th St.,
Long Beach, Calif. 90807
Filed Sept. 13, 1968, Ser. No. 759,676
Int. Cl. G02c 7/06
U.S. Cl. 351—55     1 Claim

ABSTRACT OF THE DISCLOSURE

A bridge adjustment for bifocal eyeglasses that permits a pair of lenses and frame supporting same to be moved relative to the wearer's nose to a position where the lower reading portion of the lenses are in alignment with the eyes of the user when the rest is looking up or down.

BACKGROUND OF THE INVENTION

Field of the invention

Bridge adjustment for bifocal eyeglasses.

Description of the prior art

Bifocal lenses, as is well known, include lower portions that are used for reading, and upper portions that are employed for long distance viewing. Many users of eyeglasses embodying bifocal lenses are engaged in businesses or professions in which it is necessary to read titles of books arranged in vertical stacks, as well as other printed material on vertically extending panels or walls. Such material can be read by the use of bifocal eyeglasses only by viewing the same through the lower portions of the lenses, whereby the user must hold his head in an upwardly and rearwardly tilted position that is most uncomfortable.

Although many bifocal eyeglasses of varying design have been devised and used in the past to aid the wearer in the sudden transition from the reading portion of the lenses to the long distance vision sections thereof, yet none of them have incorporated an adjustable bridge construction as provided in the present invention whereby it is possible for the wearer to easily and comfortably read any printed material which is in vertical arrangement, whether he looks up or down.

SUMMARY OF THE INVENTION

The present invention overcomes this disadvantage and permits the wearer of bifocal eyeglasses to not only use them in a conventional manner when in a sitting position, but also when standing, to so adjust the eyeglasses that the lower reading portions of the lenses and his eyes are in alignment. when the user is looking up or down. When the lower portions of bifocal lenses and the user's eyes are so aligned, titles of books in vertical racks or other printed material defined on a vertically extending surface may be easily read without tilting the head to an uncomfortable position.

A major object of the present invention is to provide a bridge adjustment for bifocal eyeglasses or other eyeglasses embodying sectional lenses in which the reading portions thereof may be brought into horizontal alignment with the user's eyes.

Another object of the invention is to supply a bridge adjustment for bifocal eyeglasses of simple mechanical structure which is easy to use, and one that can be fitted into either old or new frames.

Yet another object of the invention is to furnish a bridge adjustment which may be fabricated from standard, commercially available materials to rest on the upper nose area and permit the reading portions of bifocal lenses to be moved into alignment with the eyes when the user is looking up or down.

BRIEF DESCRIPTION OF THE DRAWING

FIG. 1 is a perspective view of a pair of bifocal eyeglasses in which a first form of bridge adjustment is incorporated into the frames thereof;

FIG. 2 is a cross-sectional view of the first form of bridge adjustment, taken on the line 2—2 of FIG. 1;

FIG. 3 is a top plan view of the first form of bridge adjustment;

FIG. 4 is a perspective view of a second form of bridge adjustment;

FIG. 5 is a cross-sectional view of the second form of bridge adjustment, taken on the line 5—5 of FIG. 4;

FIG. 6 is a cross-sectional view of the second form of bridge adjustment, taken on the line 6—6 of FIG. 5;

FIG. 7 is a perspective view of a third form of bridge adjustment and a part of the frame supporting same;

FIG. 8 is a cross-sectional view of the third form of bridge adjustment, taken on the line 8—8 of FIG. 7; and FIG. 9 is a cross-sectional view of a fourth form of bridge adjustment.

DESCRIPTION OF THE PREFERRED EMBODIMENT

In FIG. 1 two bifocal lenses A are shown supported in two encircling portions 10 of a frame B. The two portions 10 are connected by a bridge C that is an integral part of frame B. Frame B is preferably formed from a polymerized resin, or like material. Two bows D are hingedly connected to the outer extremities of portions 10 by conventional means (not shown).

The bridge C (FIG. 1) is of substantial thickness and a groove E extends downwardly in the rear portion thereof. The groove E is defined by two laterally spaced, rearwardly and inwardly tapered side surfaces, and a forward surface 14 that is substantially parallel to the brige C. The lenses A include lower portions 16 that are intended solely for use in reading, with the upper portions 16a thereof serving to assist in distance viewing.

A nose-engaging member 17 is provided that includes an elongate body 18 of trapezoidal transverse cross section which slidably but frictionally engages the groove E or a spring (not shown) or screw (not shown) associated therewith. A lip 20 projects from the lower end of body 18, as shown in FIGS. 1 and 2. The lip 20 rests on the nose (not shown) of the user, and together with body 18 cooperatively serves to support the frame B at a desired position thereon. In addition to supporting the frame B at a desired position on the nose, the lip 20 serves as a handle to permit the nose-engaging member 17 to be adjusted relative to frame B.

The first form F of the invention is simple and easy to use. The lip 20 is gripped between the thumb and forefinger, and the body 18 moved relative to the frame B to a position where, when the lip rests on the nose of the user, the lens portions 16 are in alignment with the eyes (not shown). When the user (not shown) is in a standing position looking up, he may view titles of books arranged in horizontal, vertically spaced rows, or other printed material on a vertical panel through the lens portions 16 without tilting his head upwardly and rearwardly at an awkward, uncomfortable angle. When the user of the eyeglasses is in a seated position looking down, the lip 20 is moved into abutting contact with the lower surface of bridge C. The glasses are then used in a conventional manner, with the user employing the lower portions 16 of the lenses A for reading purposes. The depth of the bridge C and the thickness of the lip 20 are so selected that the frames B and lenses A occupy a conventional position on the nose when the lip is in abutting contact with the lower surface of the bridge.

A second form G of the invention is shown in FIGS. 4–6 that is embodied in a frame B' which supports the lenses A. The frame B' includes two lens-encircling portions 10' that are connected by a bridge H. Bridge H extends between the upper extremities of the portions 10', as may be seen in FIG. 4. The lens-encircling portions 10' are formed with two laterally spaced, parallel, flat surfaces 22 situated just below the bridge H.

A nose-engaging member J is provided through which a sleeve 24 extends, as illustrated in FIG. 6. Two spring-loaded pins 28 project from the ends of sleeve 24 and engage aligned cavities 30. The cavities 30 extend into the frame portions 10' from the two flat surfaces 22. The details of the spring-loaded pins 28 are not shown, for such spring loading is conventional.

Nose-engaging member J includes a first side surface 32 and a second side surface 34. The sleeve 26 is substantially closer to first side surface 32 than to second side surface 34. When the user is in a sitting position, the nose-engaging member J occupies the position shown in FIG. 4. The nose-engaging member J is adjustably held in this position due to frictional engagement of the ends of bridge H and surfaces 22. When it is desired to read the titles of vertically stacked books or other printed material on a vertical surface (not shown), the nose-engaging member J is rotated 180° from the position shown in FIG. 4 to cause second surface 34 to rest on the user's nose. The frame B' and lenses A are both raised relative to the eyes (not shown) when the second side surface 34 rests on the nose. The user may then, while in a standing position, view printed material on a vertical surface through lens portions 16 without tilting his head at an uncomfortable angle.

A third form K of the invention is illustrated in FIGS. 7 and 8, and includes a frame L incorporating two transversely spacetd lens holding portions 36 connected by a bridge M. Bows N are pivotally connected to the lens-holding portions and extend rearwardly therefrom. Lenses A are supported in portions 36.

A groove 38 is formed in the rear portion of bridge M, and this groove is disposed in a direction substantially normal relative to the bridge. Groove 38 is defined by two laterally spaced, rearwardly and inwardly extending side walls 40, the forward ends of which are connected by a wall 42. A slot 43 is formed in bridge M, which is parallel to groove 38 and in communication therewith FIG. 7).

A rod 44 (FIG. 9) is rotatably supported in a bore (not shown) in one of the portions 36 above the lenses A therein. A sprocket 46 is disposed in slot 42, and is affixed to one end of rod 44. A circular handle 48 is secured to the opposite end of the rod 44 by means of which the sprocket 46 may be rotated.

A flat nose-engaging member P is slidably mounted in groove 38. Member P has transverse threads 52 formed on the forward surface thereof that engage sprocket 46. When handle 48 is rotated, the sprocket 46 is also rotated and moves the member P upwardly or downwardly relative to frame L.

When the frame member P is resting on the nose (not shown) of a user, and the handle 48 is rotated, the frame L and lenses A supported thereby are moved upwardly or downwardly to dispose the lens portions 16 at desired horizontal positions relative to the eyes of the user.

A part of a fourth form A of the invention is shown in FIG. 9, which is of the same general structure as third form K, except that the slot 43, shaft 44, sprocket 46, and handle 48 are eliminated therefrom.

The fourth form Q of the invention includes a bridge M' in which a cavity 54 is defined in the rear portion thereof that is in communication with an upwardly extending bore 56 formed in the bridge M'. A shaft 58 is rotatably supported in bore 56, and may be rotated by a handle 60 secured to the upper end thereof. A worm gear 62 is disposed in cavity 54, which is in engagement with the tooth-defining surface 52 of nose-engaging member P. Gear 62 is secured to the lower end of shaft 58. When shaft 58 is rotated, the nose-engaging member P is moved upwardly and downwardly relative to frame L in the same manner as in the third form K of the invention. The third form K and fourth form A serve the same function as the first form F of the invention.

I claim:
1. In combination with a polymerized resin frame for two bifocal lenses which frame includes a bridge of substantial thickness that spans the nose of a user, two bows extending rearwardly from opposite sides of said frame, the improvement for adjustably supporting said frame relative to said user's nose for elevating the lower portion of said lenses relative to the user's eyes to a desired degree, which improvement comprises: an elongate nose-engaging member formed from a polymerized resin that slidably and frictionally engages a groove formed in the rearward portion of said bridge and substantially normal to the transverse axis of said bridge, and a forwardly extending protuberance serving the dual function of acting as a support for said frame when said protuberance is in contact with the nose of a user, and as a handle that may be grasped by the user to adjust said member to a desired vertical position relative to said frame to position said lower portion of said lens in the line of sight of said user, with the transverse cross section of said groove and elongate member being of such shape that said member and protuberance cannot pivot relative to said frame.

References Cited

UNITED STATES PATENTS

| | | | |
|---|---|---|---|
| 2,203,408 | 6/1940 | Ellestad | 351—55 |
| 2,277,726 | 3/1942 | Splaine | 351—55 |
| 2,390,825 | 12/1945 | Carlisle | 351—55 |

FOREIGN PATENTS

| | | | |
|---|---|---|---|
| 427,831 | 5/1935 | Great Britain | 351—55 |
| 732,269 | 1943 | Germany | 351—55 |
| 325,817 | 1919 | Germany | 351—55 |

DAVID SCHONBERG, Primary Examiner

J. W. LEONARD, Assistant Examiner

U.S. Cl. X.R.

351—137